United States Patent
Becker (10) Patent No.: US 12,253,066 B2
(45) Date of Patent: Mar. 18, 2025

(54) METHOD FOR OPERATING A WIND TURBINE TO REDUCE BLADE ICING

(71) Applicant: General Electric Renovables Espana, S.L., Barcelona (ES)

(72) Inventor: Jörn Becker, Salzbergen (DE)

(73) Assignee: General Electric Renovables España, S.L., Barcelona (ES)

(*) Notice: Subject to any disclaimer, the term of this patent is extended or adjusted under 35 U.S.C. 154(b) by 28 days.

(21) Appl. No.: 17/833,119

(22) Filed: Jun. 6, 2022

(65) Prior Publication Data
US 2022/0389913 A1    Dec. 8, 2022

(30) Foreign Application Priority Data

Jun. 8, 2021  (EP) .................................... 21178317

(51) Int. Cl.
*F03D 80/40*    (2016.01)
*F03D 7/02*    (2006.01)
*F03D 17/00*   (2016.01)

(52) U.S. Cl.
CPC ........... *F03D 80/40* (2016.05); *F03D 7/0276* (2013.01); *F03D 7/0268* (2013.01); *F03D 7/028* (2013.01); *F03D 17/00* (2016.05)

(58) Field of Classification Search
CPC ................................. F03D 80/40; F03D 17/00
See application file for complete search history.

(56) References Cited

U.S. PATENT DOCUMENTS

| 8,050,887 B2 * | 11/2011 | Ahmann | F03D 80/40 |
| | | | 702/142 |
| 8,662,842 B2 * | 3/2014 | Oing | F03D 17/00 |
| | | | 416/65 |

(Continued)

FOREIGN PATENT DOCUMENTS

| CN | 111779641 A | 10/2020 | |
| DE | 102019106073 A1 | 9/2020 | |
| EP | 2626557 A1 * | 8/2013 | ............. F03D 80/40 |

OTHER PUBLICATIONS

European Search Report Corresponding to EP21178317 on Nov. 18, 2021.

*Primary Examiner* — Sabbir Hasan
*Assistant Examiner* — Wesley Le Fisher
(74) *Attorney, Agent, or Firm* — Dority & Manning, P.A.

(57) ABSTRACT

A method for operating a wind turbine is disclosed, wherein said wind turbine comprises a rotor having at least one rotor blade with a rotor blade surface and an icing detection device for detecting an icing condition for the rotor blade and/or for detecting the presence of icing on the rotor blade. Further, a controller configured for controlling a rotational speed of the rotor can be provided. The method comprises the steps of monitoring, via the controller and/or via the icing detection device, whether an icing condition for the rotor blade is present and/or if icing on the surface of the wind turbine is present, thus, that ice has been generated on the surface. If an icing condition is detected, or if it is detected that ice has generated on the surface of the rotor blade, the wind turbine is operated further according to a de-rated icing-mode having a reduced rotational speed, in particular while maintaining a generation of electrical energy by a generator of the wind turbine.

12 Claims, 4 Drawing Sheets

(56) References Cited

U.S. PATENT DOCUMENTS

| | | | | |
|---|---|---|---|---|
| 8,941,253 | B2* | 1/2015 | Christiansen | F03D 80/40 |
| | | | | 290/44 |
| 9,518,561 | B2* | 12/2016 | De Boer | F03D 80/40 |
| 9,523,354 | B2* | 12/2016 | Olesen | G01L 1/246 |
| 10,487,801 | B2* | 11/2019 | Beekmann | F03D 7/026 |
| 10,634,118 | B2* | 4/2020 | Runge | F03D 7/042 |
| 2010/0143127 | A1* | 6/2010 | Ahmann | F03D 80/40 |
| | | | | 73/861.85 |
| 2016/0084231 | A1* | 3/2016 | Runge | F03D 7/00 |
| | | | | 416/1 |
| 2017/0058871 | A1* | 3/2017 | Movsichoff | F03D 7/0224 |
| 2018/0066629 | A1* | 3/2018 | Beekmann | F03D 7/026 |

* cited by examiner

METHOD FOR OPERATING A WIND TURBINE TO REDUCE BLADE ICING

FIELD

The present subject matter relates generally to a method for operating wind turbines, and more particularly to a method for ensuring an operation of such a wind turbine, even under harsh environmental conditions.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbines are configured to be mounted and operated in a variety of highly different environments. For example, wind turbines are erected in a desert-like environment, but also polar regions can be chosen to be suitable for being equipped with wind energy harvesting installations like wind turbines. Therefore, a respective wind turbine is required to be adapted to special environmental conditions of the respective location of installation.

If a wind turbine is installed in a hot area, a cooling system of the wind turbine needs to have elevated capacity. In contrast, if being arranged in a cold environment, respective wind turbine must be equipped with temperature systems for enabling the wind turbine to be operated without being negatively affected by cold temperatures. Specifically, known wind turbines adapted for being operated in a cold area have a system for counteract the generation of ice on a surface of a rotor blade, commonly known as "icing". For example, a wind turbine having a de-icing system for a rotor blade may have an arrangement for heating up a respective surface of the rotor blade.

As such, icing conditions can create a challenge to maintain operation of the wind turbine, for example, when the heating capacity of the de-icing system is not sufficiently configured for maintaining an ice free rotor blade during very cold and intense icing conditions. In such cases, the operation of the wind turbine is to be stopped in order to protect the structures of the wind turbine from being harmfully affected by additional loads caused by icing.

Accordingly, the present disclosure is directed to a method for optimizing an operation of a wind turbine in cold environmental conditions.

BRIEF DESCRIPTION

Aspects and advantages of the invention will be set forth in part in the following description, or may be obvious from the description, or may be learned through practice of the invention.

In one aspect, the present disclosure is directed to a method for operating a wind turbine, wherein said wind turbine comprises a rotor having at least one rotor blade with a rotor blade surface and an icing detection device for detecting an icing condition for the rotor blade and/or for detecting the presence of icing on the rotor blade. Further, a controller configured for controlling a rotational speed of the rotor can be provided. The icing detection device and the controller can be integrated in one single controlling device, for example in a main controller of the wind turbine. In the alternative, the icing detection device may be a separate device being specifically directed to analyze data representative of the operation of the wind turbine in order to determine if an icing condition or icing on a rotor blade is present.

According to an embodiment, the term "icing condition is present" includes both: either that icing is imminent, in fact that the environmental and operational conditions of the wind turbine indicate a high probability of ice is going to be generated on a surface of the rotor blade; furthermore either that icing is already present, in fact that the environmental and operational conditions of the wind turbine indicate a high probability of ice already having been generated on a surface of the rotor blade.

According to an embodiment, the icing detection device may be a specific detector arranged on or at the wind turbine, or in an effective surrounding of the wind turbine, which is capable for detecting icing conditions on the rotor blades, as for example provided by the company Labkotek. Thus, said types of icing detection devices detect a so-called "instrumental icing condition", which therefore is a specific form of an icing condition.

Alternatively or additionally, the icing condition may include the so-called "instrumental icing", wherein an instrument, a sensor, supportive device, for example an anemometer, a temperature sensor, a weather vane of the wind turbine has developed a certain amount of icing, which consequently deteriorates or inhibits a functioning of the respective device. If a negative consequence of the icing on the functionality of such a device is detected, for example the weathervane does not move properly, or the anemometer does not indicate the presence of wind while the wind turbine is operating and generating energy, an instrumental icing and therefore an icing condition is detected.

The method comprises the steps of monitoring, via the controller and/or via the icing detection device, whether an icing condition for the rotor blade is present and/or if icing on the surface of the wind turbine is present, thus, that ice has been generated on the surface. If an icing condition is detected, or if it is detected that ice has generated on the surface of the rotor blade, the wind turbine is operated further according to a de-rated icing-mode having a reduced rotational speed, in particular while maintaining a generation of electrical energy by a generator of the wind turbine.

In particular, aforementioned method step of operating the wind turbine according to the de-rated icing-mode having a reduced rotational speed is deliberately implemented if the wind turbine, due to sufficient wind speed, theoretically could be operated at full rated power or at an elevated power level above the de-rated icing-mode. Hence, the de-rated icing-mode according to the described method step is an operational mode having a deliberate reduction of power generation and/or rotational speed in order to prevent icing and/or in order to mitigate icing. The de-rated icing-rated mode is not to be confused with operating the wind turbine in a standard de-rated mode due to a lack of wind speed or due to further operational influences. Also, the wind turbine may switch to operate according to the de-rated icing-mode when not operating at rated power but at a reduced power output due to a lack of wind speed. Hence, the de-rated icing-mode differs from a standard operational mode of the wind turbine by having a relatively reduced rotational speed.

Alternatively or in addition, the de-rated icing-mode is initiated if an icing severity exceeds a de-icing capacity of the rotor blade, wherein the icing severity is represented by a quantity of heat dissipation of thermal energy out of the rotor blade in an environment of the rotor blade, for example, in the air passing the rotor blade, and wherein the de-icing capacity of the rotor blade may be reflected by a maximum of thermal power being available in the rotor blade or being provided to the rotor blade, wherein a respective thermal energy of the thermal power counteracts an icing of the rotor blade by maintaining or elevating rotor blade's temperature.

For example, the de-icing capacity can be caused by thermal energy coming from a hub of the rotor of the wind turbine and flowing in an interior of the rotor blade, by solar energy when the solar radiation is heating up the rotor blade, and/or by an explicit ice mitigation device for heating up the rotor blade.

According to an embodiment, an amount of rotational reduction of the rotational speed is determined such that a generation of ice on the rotor blade surface is prevented and/or that icing on the rotor blade's surface is detaching.

By implementing aforementioned teaching it is achieved for the first time that operation can be maintained even if an icing condition is present or if icing of a rotor blade is detected. By reducing rotational speed of the rotor a relative wind speed of a respective rotor blade is also reduced. In the course of the development of the present invention it has been found out that carefully adapting rotational speed to environmental conditions of the wind turbine, in particular to icing conditions, provides the opportunity to maintain operation of the wind turbine instead of completely shutting down the wind turbine if an icing condition or icing on the rotor blade is detected. In particular, by reducing the rotational speed of the rotor of the wind turbine the operation is aligned to the icing condition and/or to environmental conditions of the wind turbine such that the generation of ice on the rotor blade surface is prevented and/or that ice on the rotor blade's surface is detaching. By reducing the rotational speed the amount of heat dissipation from the rotor blade in the environment can be controlled.

In one embodiment the de-rated icing-mode includes operating the wind turbine with a reduced power output, wherein a respective amount of power reduction is determined such that a generation of ice on the rotor blade surface is prevented and/or that ice on the rotor blade surface is detaching.

According to an embodiment, the wind turbine further comprises an ice mitigation device for providing a de-icing heat flow to the rotor blade surface, wherein the method comprises activating the ice mitigation device.

According to an embodiment, an icing condition is detected if an analysis of operational data, in particular in conjunction with a look-up-table and/or with an icing model of the wind turbine and/or with an icing model of the rotor blade indicates that a generation of ice on the rotor blade surface is imminent and/or indicates a presence of ice on the rotor blade surface. For example, such operational data may include an amount of solar radiation detected by a solar radiation sensor, a temperature of the rotor blade surface, ambient temperature, wind speed, relative wind speed, rotational speed, air humidity, environmental heat input, rotational imbalance, and/or reduced power generation.

In this context it is disclosed that the step of detecting whether an icing condition or ice on a rotor blade is present comprises declaring a rotor blade status "icing confirmed" if icing is present on the rotor blade surface, and/or declaring a rotor blade status "icing imminent" if no ice is detected while an upcoming generation of icing on the rotor blade is imminent.

Specifically, if the rotor blade status is "icing confirmed", the method comprising: determining the amount of rotational reduction and/or determining the amount of power reduction such that the rotor is rotated with a minimum de-rated rotational speed thereby generating a minimum electrical power, wherein respective generated electrical energy is entirely supplied to the wind turbine and/or, if the wind turbine is arranged in a wind park, to a further wind turbine of the wind park, in particular wherein essentially no electrical energy is transmitted into an electrical grid connected to the wind turbine and/or to the wind park. In particular, the electrical grid as aforementioned represents an electrical grid beyond the grid connection point of the wind turbine or a wind park of the wind turbine. If the wind turbine is part of a larger wind park, a respective this wind turbine may still supply electrical energy to another wind turbine of the respective wind park, for example to a wind turbine being fully iced and therefore non-operable.

Furthermore, it is disclosed that the method comprises: determining the amount of rotational reduction and/or determining the amount of power reduction such that sufficient electrical energy is generated for operating the wind turbine and/or the wind park without energy extraction from the grid while operating the ice mitigation device at a maximum heating power output, and/or while operating at least one further ice mitigation device of at least one further wind turbine of the wind park at a maximum heating power output. By this it is achieved that loads are reduced to a minimum while minimizing receiving of external energy from the energy grid, and thereby reducing the costs for ice mitigation.

According to an embodiment of the method, declaring the rotor blade status "icing imminent" includes to determine the amount of rotational reduction and/or determining the amount of power reduction such that the rotor is rotated with a maximum de-rated rotational speed thereby generating a maximum electrical power while a generation of ice on the rotor blade surface is prevented, and in particular while operating the ice mitigation device at a maximum heating power output.

However, if icing is detected, and an effect of such icing on loads of the wind turbine is acceptable and/or icing caused additional loads are not exceeding a predetermined load threshold, the method includes to determine the amount of rotational reduction and/or to determine the amount of power reduction such that the rotor is rotated with a maximum de-rated rotational speed. By this, a maximum amount electrical power is still generated while imminent icing is prevented and/or while thermal icing removal is occurring, and in particular while operating the ice mitigation device at a maximum heating power output.

Therefore, in particular, if icing is detected, a synergistic effect of the present disclosure can be observed: the reduction of rotational speed and/or of the amount of power reduction have amplifying effects on the efficiency of the ice mitigation process and on the reduction of icing-caused loads.

In a further embodiment, the method comprises determining a temperature of the rotor blade, in particular a surface temperature of the rotor blade surface, and determining the amount of rotational reduction and/or determining the amount of power reduction such that a temperature gradient of the temperature exceeds a temperature gradient threshold, in particular wherein the temperature gradient threshold exceeds 0° C./min, preferably exceeds 1.1° C./min. According to certain embodiments, the temperature gradient threshold may exceed even 10°/min. Regardless, according to an alternative embodiment the temperature gradient threshold is below 10° C./min, preferably is below 5° C./min.

Alternatively or additionally, the amount of rotational reduction and/or determining the amount of power reduction is determined such that the surface temperature exceeds a surface temperature threshold, in particular wherein the temperature threshold exceeds 0° C., preferably exceeds 3° C., and/or in particular wherein the temperature threshold is below 10° C., preferably is below 5° C., and/or that a dissipation of thermal energy of the rotor blade in an environment of the wind turbine does not exceed a heat flow threshold. In case of the latter, the heat flow threshold may be determined according to a maximum heat flow input into the rotor blade, wherein the maximum heat inflow can be caused by the heating of the rotor blade by operating the ice mitigation system, by solar radiation, and/or by warm air being blown from the hub in the rotor blade.

According to a specific aspect of the invention, the method comprises determining a temperature of the rotor blade, in particular a surface temperature of the rotor blade. Said determination may be achieved by measuring a temperature of the rotor blade, in particular by measuring the surface temperature of the rotor blade with the help of a sensor.

Additionally or alternatively, the determination of the temperature or of the surface temperature of the rotor blade can be achieved by estimation. Such estimation of a temperature can at least based on an ambient temperature, a wind speed, the rotational speed, a pitch angle of the rotor blade, a relative wind speed of the rotor blade, an air humidity, an environmental heat input, and/or based on an inner air temperature within an inner volume of the rotor blade, and/or in particular by using a model of the surface temperature and/or a look-up-table. The application of an estimate can be included in the step of detecting an icing condition, wherein an icing condition is detected if a generation ice on the rotor blade surface is imminent and/or indicates a presence of ice on the rotor blade surface.

According to an embodiment, the rotor blade comprises a plurality of temperature sensors positioned at different locations of the rotor blade. By this, a plurality of measured temperatures or surface temperatures of the rotor blade are available for optimizing the accuracy of the operational decision about operating the wind turbine in the de-rated icing-mode. For example, the step of determining the amount of rotational reduction and/or determining the amount of power reduction uses at least or exclusively a lowest value of the plurality of measured surface temperatures. This results in being able to identify a critical operational situation at the earliest convenience, even if a plurality of measured temperatures does incorrectly indicate a critical situation that icing is present or imminent.

According to an embodiment the method comprises the step of entering a shutdown mode if severe icing of the rotor blade is detected. The term "severe icing" represents an icing situation, wherein icing leads to an inacceptable increase of loads, thus, wherein icing caused loads are exceeding a predetermined load threshold. Optionally, the shutdown mode may include entirely stopping the rotation of the wind turbine or activating an idling mode of the wind turbine.

In another aspect, the present disclosure is directed to a wind turbine comprising a rotor having at least one rotor blade with a rotor blade surface, an icing detection device for detecting an icing condition for the rotor blade and/or for detecting icing on the rotor blade. Additionally or alternatively, the wind turbine comprises a controller, wherein the controller is configured for controlling a rotational speed of the rotor. The icing detection device and the controller can be integrated in one single controlling device, for example, in a main controller of the wind turbine such that the controller is configured for controlling a rotational speed of the wind turbine and for detecting an icing condition for the rotor blade and/or icing being present on the rotor blade. In the alternative, the icing detection device may be a separate device being specifically directed to analyze data representative of the operation of the wind turbine in order to determine if an icing condition or icing on a rotor blade is present. The controller or the icing detection device is configured to monitor whether an icing condition for the rotor blade or icing on the rotor blade is present, wherein the wind turbine is operated further according to a de-rated icing-mode having reduced rotational speed if an icing condition or icing on the rotor blade is detected.

According to an embodiment the wind turbine comprises an ice mitigation device for providing a de-icing heat flow to the rotor blade, in particular to the rotor blade surface of the rotor blade. If an icing condition or icing on the rotor blade is detected the ice mitigation device is activated.

In particular, the ice mitigation device comprises a direct heating system for directly generating thermal energy in a rotor blade skin of the rotor blade surface, and/or a hot air system for increasing an inner temperature in an inner volume of the rotor blade.

According to an embodiment, the wind turbine comprises at least one temperature sensor positioned with the rotor blade for measuring a temperature of the rotor blade, in particular for measuring a surface temperature of the rotor blade surface.

Additionally, the icing detection device and/or the controller is/are configured to conduct any step of the preceding described embodiments of methods for controlling the wind turbine.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Single features depicted in the figures are shown relatively with regards to each other and therefore are not necessarily to scale. Similar or same elements in the figures, even if displayed in different embodiments, are represented with the same reference numbers

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
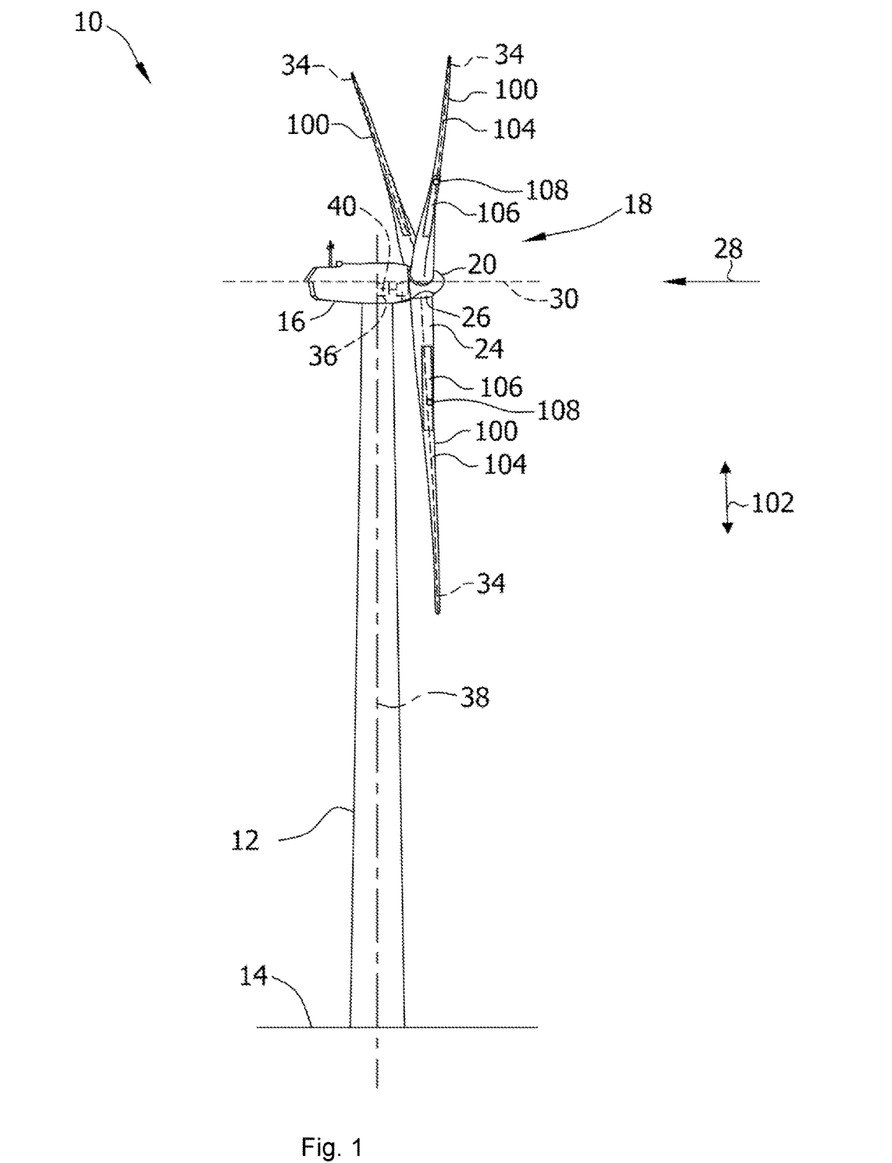
FIG. 1 illustrates a perspective view of one embodiment of a wind turbine according to the present disclosure.

FIG. 1 is a perspective view of an exemplary wind turbine 10. In the exemplary embodiment, the wind turbine 10 is a horizontal-axis wind turbine. Alternatively, the wind turbine 10 may be a vertical-axis wind turbine. In the exemplary embodiment, the wind turbine 10 includes a tower 12 that extends from a support system 14, a nacelle 16 mounted on tower 12, and a rotor 18 that is coupled to nacelle 16. The rotor 18 includes a rotatable hub 20 and at least one rotor blade 100 coupled to and extending outward from the hub 20. In the exemplary embodiment, the rotor 18 has three rotor blades 100. In an alternative embodiment, the rotor includes more or less than three rotor blades. In the exemplary embodiment, the tower 12 is fabricated from tubular steel to define a cavity (not shown in FIG. 1) between a support system 14 and the nacelle 16. In an alternative embodiment, the tower 12 is any suitable type of a tower having any suitable height.

The rotor blades 100 are spaced about the hub 20 to facilitate rotating the rotor 18 to enable kinetic energy to be transferred from the wind into usable mechanical energy, and subsequently, electrical energy. The rotor blades 100 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 100 are transferred to the hub 20 via the load transfer regions 26.

In one embodiment, the rotor blades 100 have a length ranging from about 15 meters (m) to about 91 m. Alternatively, rotor blades 100 may have any suitable length that enables the wind turbine 10 to function as described herein. For example, other non-limiting examples of blade lengths include 20 m or less, 37 m, 48.7 m, 50.2 m, 52.2 m or a length that is greater than 91 m. As wind strikes the rotor blades 100 from a wind direction 28, the rotor 18 is rotated about an axis of rotation 30. As the rotor blades 100 are rotated and subjected to centrifugal forces, the rotor blades 100 are also subjected to various forces and moments. As such, the rotor blades 100 may deflect and/or rotate from a neutral, or non-deflected, position to a deflected position.

The rotor blade 100 extends in a longitudinal direction 102 and comprises a rotor blade surface 104, wherein said rotor blade surface 104 can be a pressure surface of the rotor blade 100, a suction surface of the rotor blade 100, a surface of a leading-edge of the rotor blade 100, or a surface of a trailing edge of the rotor blade 100. Furthermore, the rotor blade 100 includes an ice mitigation device 106 for providing thermal energy to the rotor blade surface 104 in order for prevent a generation of ice on the rotor blade surface 104 (icing), and/or for removing ice from the rotor blade surface 104 by at least partially melting said ice and thereby reducing an adhesion of ice and the rotor blade surface 104.

For example, the ice mitigation device 106 comprises a direct heating system for directly generating thermal energy in a rotor blade skin of the rotor blade surface, and/or a hot air system for increasing an inner temperature in an inner volume of the rotor blade. According to an embodiment, the ice mitigation device 106 comprises heating strips or heating mats which are arranged within a shell of the rotor blade 100 or on an inner surface of a shell of the rotor blade 100.

The wind turbine 10 further comprises an ice detection device configured for detecting an icing condition for the rotor blade 100 or for detecting icing on the rotor blade 100.

Moreover, a pitch angle of the rotor blades 100, i.e., an angle that determines a perspective of the rotor blades 100 with respect to the wind direction, may be changed by a pitch system 32 to control the load and power generated by the wind turbine 10 by adjusting an angular position of at least one rotor blade 100 relative to wind vectors. Pitch axes 34 of rotor blades 100 are shown. During operation of the wind turbine 10, the pitch system 32 may change a pitch angle of the rotor blades 100 such that the rotor blades 100 are moved to a feathered position, such that the perspective of at least one rotor blade 100 relative to wind vectors provides a minimal surface area of the rotor blade 100 to be oriented towards the wind vectors, which facilitates reducing a rotational speed and/or facilitates a stall of the rotor 18.

In the exemplary embodiment, a blade pitch of each rotor blade 100 is controlled individually by a wind turbine controller 36 or by a pitch control system 80. Alternatively, the blade pitch for all rotor blades 100 may be controlled simultaneously by said control systems.

Further, in the exemplary embodiment, as the wind direction 28 changes, a yaw direction of the nacelle 16 may be rotated about a yaw axis 38 to position the rotor blades 100 with respect to wind direction 28.

In the exemplary embodiment, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. According to an embodiment, the wind turbine controller 36 includes the icing detection device for detecting an icing condition or an icing on the rotor blade 100.

Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
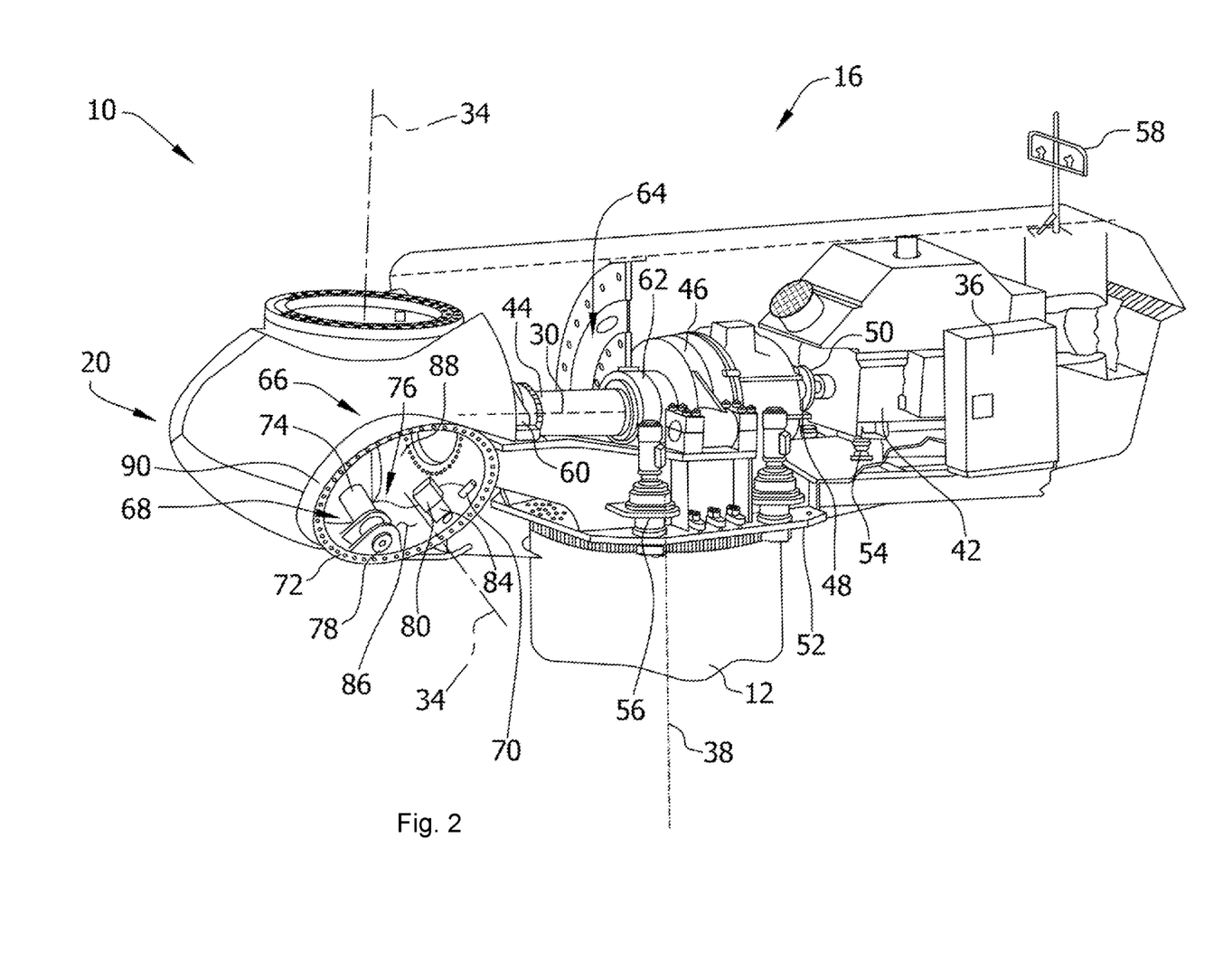
FIG. 2 illustrates a simplified, internal view of one embodiment of a nacelle of a wind turbine according to the present disclosure, particularly illustrating the nacelle during standard operation.

FIG. 2 is an enlarged sectional view of a portion of the wind turbine 10. In the exemplary embodiment, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the exemplary embodiment, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50.

The gearbox 46 and generator 42 may be supported by a main support structure frame of the nacelle 16, optionally embodied as a main frame 52. The gearbox 46 may include a gearbox housing that is connected to the main frame 52 by one or more torque arms 103. In the exemplary embodiment, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Preferably, the main frame 52 is configured to carry the entire load caused by the weight of the rotor 18 and components of the nacelle 16 and by the wind and rotational loads, and furthermore, to introduce these loads into the tower 12 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 100 with respect to the wind direction 28.

For positioning the nacelle appropriately with respect to the wind direction 28, the nacelle 16 may also include at least one meteorological mast 58 that may include a wind vane and anemometer (neither shown in FIG. 2). The mast 58 provides information to the wind turbine controller 36 that may include wind direction and/or wind speed.

In the exemplary embodiment, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 100 (shown in FIG. 1) for modulating the pitch angel of a rotor blade 100 along the pitch axis 34. Only one of three pitch drive systems 68 is shown in FIG. 2.

In the exemplary embodiment, the pitch assembly 66 includes at least one pitch bearing 72 coupled to hub 20 and to a respective rotor blade 100 (shown in FIG. 1) for rotating the respective rotor blade 100 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 100 upon receipt of one or more signals from the wind turbine controller 36. In the exemplary embodiment, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servo-mechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 also includes one or more pitch control systems 80 for controlling the pitch drive system 68 according to control signals from the wind turbine controller 36, in case of specific prioritized situations and/or during rotor 18 overspeed. In the exemplary embodiment, the pitch assembly 66 includes at least one pitch control system 80 communicatively coupled to a respective pitch drive system 68 for controlling pitch drive system 68 independently from the wind turbine controller 36. In the exemplary embodiment, the pitch control system 80 is coupled to the pitch drive system 68 and to a sensor 70. During standard operation of the wind turbine 10, the wind turbine controller 36 controls the pitch drive system 68 to adjust a pitch angle of rotor blades 100.

In one embodiment, in particular when the rotor 18 operates at rotor overspeed, the pitch control system 80 overrides the wind turbine controller 36, such that the wind turbine controller 36 no longer controls the pitch control system 80 and the pitch drive system 68. Thus, the pitch control system 80 is able to make the pitch drive system 68 to move the rotor blade 100 to a feathered position for reducing a rotational speed of the rotor 18.

According to an embodiment, a power generator 84, for example comprising a battery and/or electric capacitors, is arranged at or within the hub 20 and is coupled to the sensor 70, the pitch control system 80, and to the pitch drive system 68 to provide a source of power to these components. In the exemplary embodiment, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the exemplary embodiment, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface 90 of hub 20 and may be coupled, directly or indirectly, to outer surface 90.

Figure 3:
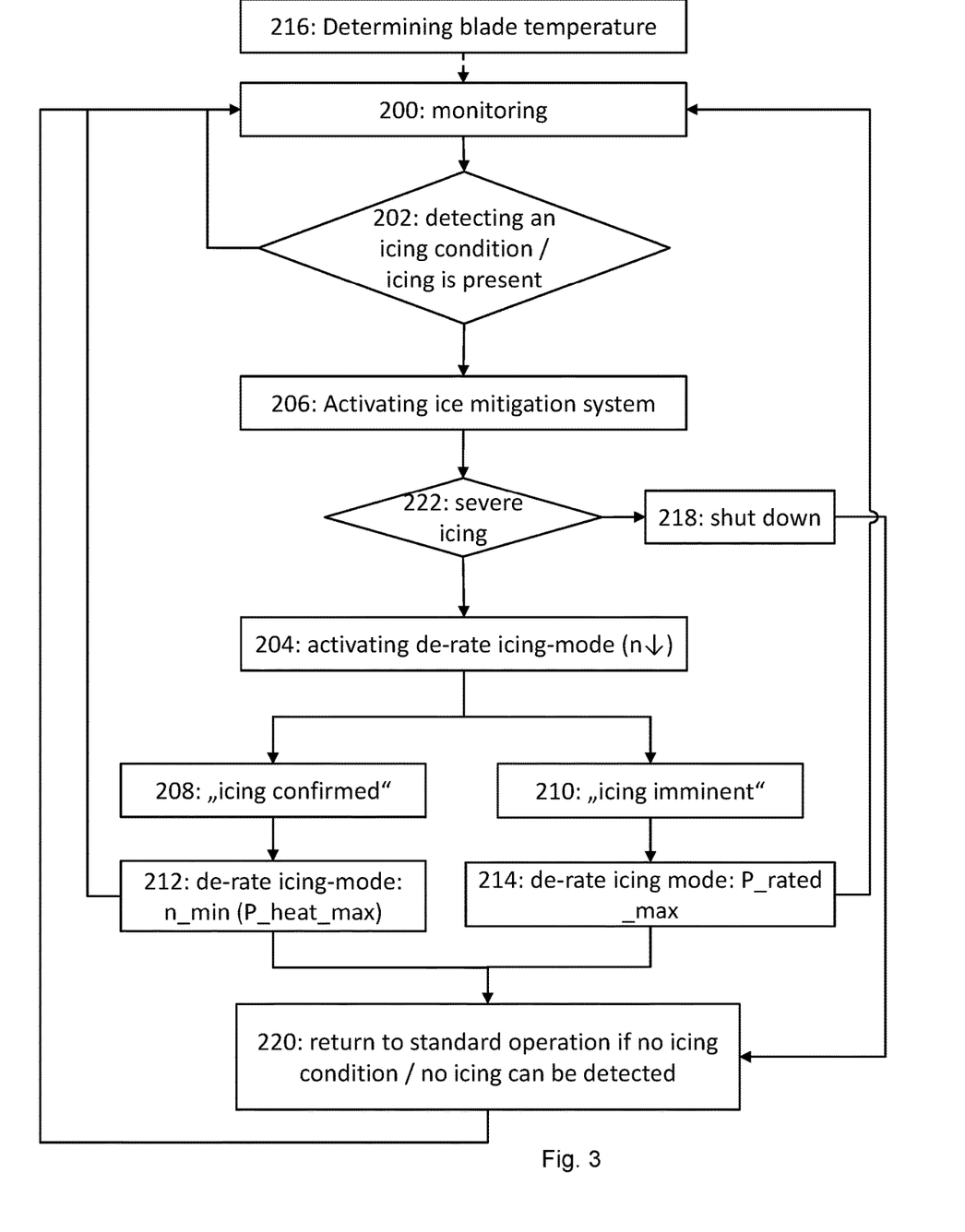
FIG. 3 reflect an embodiment of a method for operating the wind turbine according to FIG. 1.
Figure 4:
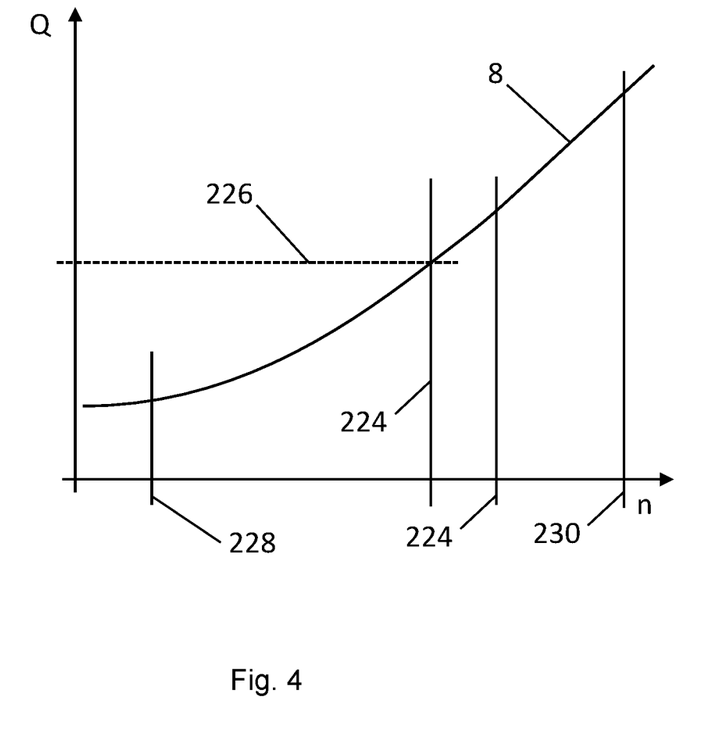
FIG. 4 schematically indicates an exemplary control strategy applied in the method according to FIG. 3.

FIG. 3 shows an example of an embodiment of a method for operating the wind turbine according to the present invention, wherein FIG. 4 depicts a working principle of the present disclosure.

According to FIG. 3, operational data is collected in step 200 by monitoring an operation of the wind turbine 10. Initially, the wind turbine is operated in a standard mode according to a general operational standard. For example, if the wind speed at least reaches rated wind speed the wind turbine 10 is operated at rated power. Monitoring 200 may include a step 216 of determining a blade temperature of the rotor blade 100. In particular, the step 216 may comprise the determination of a surface temperature of the rotor blade surface 104.

In step 202 it is detected via the icing detection device and/or via the wind turbine controller 36 if an icing condition is present or if ice has developed on the rotor blade 100, in particular on the rotor blade surface 104. In case the icing condition is confirmed by the icing detection device, an ice mitigation device 106 can be activated in step 206. This ice mitigation device 106 is configured for providing a de-icing heat flow to the rotor blade surface 104, for example by activating heating elements being arranged in a shell of the rotor blade 100 or by blowing hot air into an interior of the rotor blade 100. Generally, the ice mitigation device 106 is configured for heating up the rotor blade surface 104 of the rotor blade 100, thus, that the icing condition is eliminated and/or that ice, which is already present on the rotor blade surface 104, is at least partially melted and subsequently detaching from the rotor blade surface 104.

In a step 222 the wind turbine controller 36 and/or the ice detection device may conduct a procedure for checking if severe icing is present on the rotor blade 100. If severe icing 222 is present, a specific icing situation is detected in which icing leads to an inacceptable increase of loads for the wind turbine 10, for the rotor 18 and/or for the rotor blade 100. In such case, a shutdown step 218 for shutting down the wind turbine 10 is initiated, wherein either the rotation of the rotor 18 can be entirely brought to a halt or wherein rotor 18 is put in an idling mode by moving the rotor blade 100 in a feathered position.

In step 204 a de-rate icing-mode is activated. According to the de-rate icing-mode the rotor 18 of the wind turbine 10 is operated with a reduced rotational speed compared to the standard operational mode, in which the wind turbine was operated prior to switching to the de-rate icing-mode. By reducing the rotational speed of rotor 18, a relative wind speed of the rotor blade 100 is reduced.

FIG. 4 describes the effect of reducing rotational speed of rotor 18 on de-icing of the rotor blade 100, while assuming one specific environmental condition. The dissipation of thermal energy of the rotor blade 100 in the surrounding and passing air increases with the relative wind speed. Hence, at a certain rotational speed, while assuming constant environmental conditions, a maximum heating capacity 226 of the ice mitigation device 106 is surpassed. This leads to a cooling down of the rotor blade 100 and of the rotor blade surface 104 which subsequently may result in a generation of ice on the rotor blade surface 104. Therefore, the reduction of rotational speed of the rotor 18 is chosen such that a generation of ice on the rotor blade surface 104 is prevented and/or that the detected icing condition is no longer present.

For example, in FIG. 4 the wind turbine 10 initially is operated in a standard operational mode having a standard rotational speed 224. Hence, the wind speed facing the wind turbine 10 is facilitating that the rotor 18 rotates faster than a cut-in rotational speed 228 and slower than a cut-out rotational speed 230 of the wind turbine 10. The wind turbine 10 may be operated at rated power including a rated rotational speed when rotating with the standard rotational speed 224. Regardless, the standard rotational speed 224 may also represent a rotational speed below rated rotational speed.

According to the example of FIG. 4, an icing condition is detected while operating the wind turbine 10 according to a standard operational mode with the standard rotational speed 224. Furthermore it is detected that the dissipation of thermal energy of the rotor blade 100 exceeds the maximum heating capacity 226 of the ice mitigation device 106 when the rotor 18 is rotated with standard rotational speed 224.

According to the specific example, but not limited to it, a status "icing imminent" is declared in step 210. Accordingly, it has not been confirmed that ice has already generated on the rotor blade surface 104 or any ice being already present on the rotor blade surface 104 is not considered to be critical to any wind turbine load. For that reason, in step 214 the desired rotational speed of rotor 18 is determined such, that dissipation of thermal energy of rotor blade 100 falls just below (or equals) the maximum heating capacity 226 in order to prevent ice being generated on the rotor blade surface 104 or in order for ice already generated being removed by melting an adhesive layer between the ice and the rotor blade surface 104. Hence, according to this type of de-rate icing-mode it is decided in step 214 to optimize power generation of the wind turbine 10.

In contrast to step 210, it may also be detected that ice has already been generated on the rotor blade surface and a status "icing confirmed" is declared. In particular, it is determined that the ice on the rotor blade surface 104 has a non-negligible impact on the load situation of the wind turbine 10. For that reason, the reduction of rotational speed of rotor 18 according to step 212 is also based on a desired load reduction effect, hence, the reduction of the rotational speed of rotor 18 is larger than the reduction of the rotational speed in step 214. If required, the rotational speed of rotor 18 is reduced in step 212 such that energy generated by the wind turbine is entirely consumed by the ice mitigation device 106 and by further components of the wind turbine 10, while no electrical energy is delivered to the electric grid to which the wind turbine 10 is connected.

Step 212 and step 214, respectively, operational situations 208 "icing confirmed" and 210 "icing imminent", reflect extreme operational situations wherein either energy generation is maximized or icing-caused loads are minimized while maintaining operation. Therefore, it shall also be disclosed that there are a variety of interim operational situations between situation 208 "icing confirmed" and situation 210 "icing imminent", wherein the rotational speed and possibly further operational details of the wind turbine 10 are carefully chosen in order to optimize the operation of the wind turbine 10 to the specific situation.

Furthermore, the respective determination of rotational speed and/or of generated power of wind turbine 10 may be achieved in an iterative manner, wherein a certain desired rotational speed/generated power is determined and a subsequent effect on the icing condition, on a temperature gradient, or on a temperature of the rotor blade 100 or of the rotor blade surface 104 is observed, and consequently a new desired rotational speed may be determined. For example, the amount of rotational reduction and/or determining the amount of power reduction is embodied such that a temperature gradient of the temperature of the rotor blade 100 or of the rotor blade surface 104 exceeds a specific temperature gradient threshold, for example, wherein the temperature gradient threshold exceeds 0° C./min, preferably exceeds 1.1° C./min, and/or in wherein the temperature gradient threshold is below 3° C./min, preferably is below 2° C./min. Additionally or alternatively, the temperature of the rotor blade 100 or the temperature of the rotor blade surface 104 may be used as an input factor for determining the reduction in rotational speed and/or of generated power. For example, the reduction of rotational speed of rotor 18 is determined such, that the temperature exceeds a temperature threshold, in particular wherein the temperature threshold exceeds 0° C., preferably exceeds 1° C., and/or in particular wherein the temperature threshold is below 5° C., preferably is below 3° C. Further additionally or alternatively, the reduction of rotational speed of rotor 18 is determined such, that a dissipation of thermal energy of the rotor blade 100 in an environment of the wind turbine 10 does not exceed a maximum heating capacity 226 of the ice mitigation device 106.

When it is determined in step 220 that wind turbine 10 may be operated in standard operation 200 without the threat that an icing condition is repeatedly detected, the de-rate icing-mode is terminated and wind turbine 10 continues to operate according to a standard operational mode.

The order of steps has exemplary shown in FIG. 3 shall not limit the claimed method for operating a wind turbine, for example, the step 222 for checking if severe icing is present may as well be conducted prior to step 206 or even after step 204, or at any other reasonable strategic position. The same applies for the step 206 of activating the ice mitigation system 106, wherein this step 206 may also be timely and/or hierarchy-wise positioned in an attractive manner. Even further, an embodiment may be possible, wherein the wind turbine either comprise an ice mitigation system, nor step 206 of activating the ice mitigation device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include elements that do not differ from the literal language of the claims, or if they include equivalent structural elements with insubstantial differences from the literal languages of the claims.

The present invention is not limited to the above-described embodiments and modifications and may be embodied in various forms within the gist thereof, for example, that the wind turbine 10 does not comprise an ice mitigation device 106 but still can implement the method for operating a wind turbine as disclosed. The technical features may also be omitted as appropriate unless they are described as being essential in this specification.

REFERENCE NUMBERS 10 wind turbine
12 tower
14 support system
16 nacelle
18 rotor
20 rotatable hub
24 blade root portion
26 load transfer regions
28 wind direction
30 axis of rotation
32 pitch system
34 pitch axes
36 when turbine controller
38 yaw axis
40 processor
42 electric generator
44 main shaft
46 gearbox
48 high speed shaft
50 coupling
52 main frame
54 decoupling support means
56 yaw drive mechanism
58 meteorological mast
60 forward support bearing
62 aft support bearing
64 drive train
66 pitch assembly
68 pitch drive system
70 sensor
72 pitch bearing
74 pitch drive motor
76 pitch drive gearbox
78 pitch drive pinion
80 pitch control system
84 power generator
86 cavity
88 inner surface
90 outer surface
100 rotor blade
102 longitudinal direction
104 rotor blade surface
106 ice mitigation device
108 temperature sensor
200 monitoring
202 detecting an icing condition
204 activating de-rate mode
206 activating ice mitigation system
208 declaring "icing confirmed"
210 declaring "icing imminent"
212 determining
214 determining
216 determining blade temperature
218 activating shutdown mode
220 return to standard operation
222 checking on severe icing
224 standard operational speed
226 maximum heating capacity
228 cut-in rotational speed
230 cut-out rotational speed

The invention claimed is:

1. A method for operating a wind turbine, wherein the wind turbine includes a rotor with at least one rotor blade having a rotor blade surface, and an icing detection device configured to detect an icing condition for the rotor blade, the method comprising:
monitoring, via the icing detection device, whether an icing condition for the rotor blade is present, wherein the icing condition indicates that icing is imminent, but not actually present on the rotor blade;
when the icing condition for the rotor blade is detected, initiating operation of an ice mitigation device that provides a de-icing heat flow to the rotor blade and operating the wind turbine according to a de-rated icing-mode having a reduced rotor rotational speed; and
wherein the reduced rotor rotational speed is determined based on dissipation of thermal energy of the rotor blade due to blade rotation being at or below a maximum heating capacity of the ice mitigation device.

2. The method according to claim 1, wherein the icing condition is detected based on an analysis of operational data or an icing model.

3. The method according to claim 2, wherein the analysis declares a rotor blade status of "icing confirmed" when icing is present on the rotor blade surface, or declares a rotor blade status of "icing imminent" when no icing is detected but icing is imminent.

4. The method according to claim 3, wherein when the rotor blade status is "icing confirmed", the method comprises further reducing the rotor rotational speed or a power reduction of the wind turbine such that the rotor is rotated with a minimum de-rated rotational speed thereby generating a minimum electrical power that is entirely supplied to the wind turbine or to a different wind turbine in a wind park.

5. The method according to claim 4, wherein the wind turbine or the wind park are connected to a grid, and the minimum electrical power is sufficient to operate the wind turbine or the wind park without energy extraction from the grid while operating the ice mitigation device of the wind turbine at a maximum heating power output.

6. The method according to claim 5, wherein when the rotor blade status is "icing imminent", the wind turbine generates and supplies a maximum electrical power to the grid at the reduced rotational speed of the rotor while a generation of ice on the rotor blade surface is not present.

7. The method according to claim 1, further comprising determining a temperature of the rotor blade, and determining the reduced rotor rotational speed of the rotor or a power reduction of the wind turbine such that: a temperature gradient of the temperature exceeds a temperature gradient threshold; or a surface temperature of the rotor blade surface exceeds a surface temperature threshold.

8. The method according to claim 7, wherein determining a temperature of the rotor blade comprises determining a surface temperature of the rotor blade with a temperature sensor configured on the rotor blade.

9. The method according to claim 8, wherein the rotor blade includes a plurality of the temperature sensors positioned at different locations of the rotor blade to provide a plurality of measured temperatures, wherein the step of determining the reduced rotational speed of the rotor or reduction of power production of the wind turbine is based on one or more of the lowest values of the measured temperatures.

10. The method according to claim 7, wherein determining a temperature of the rotor blade comprises estimating a surface temperature of the rotor blade based on: (a) one or more variables including ambient temperature, a wind speed, the rotational speed of the rotor, a pitch angle of the rotor blade, a relative wind speed of the rotor blade, an air humidity, or an environmental heat input; or (b) an inner air temperature within an inner volume of the rotor blade.

11. The method according to claim 1, further comprising operating the wind turbine in a shutdown mode upon detection of icing of the rotor blade above a defined severe value.

12. A wind turbine, comprising:
a rotor comprising at least one rotor blade having a rotor blade surface;
an icing detection device;
a wind turbine controller that controls a rotational speed of the rotor, the wind turbine controller in communication with the icing detection device and configured to perform the following operations:
monitoring whether an icing condition of the rotor blade is present, wherein the icing condition indicates that icing is imminent, but not actually present on the rotor blade;
when the icing condition for the rotor blade is detected, initiating operation of an ice mitigation device that provides a de-icing heat flow to the rotor blade and operating the wind turbine in a de-rated icing-mode having a reduced rotational speed of the rotor; and
wherein the reduced rotor rotational speed is determined based on dissipation of thermal energy of the rotor blade due to blade rotation being at or below a maximum heating capacity of the ice mitigation device.

\* \* \* \* \*